Figure 1:
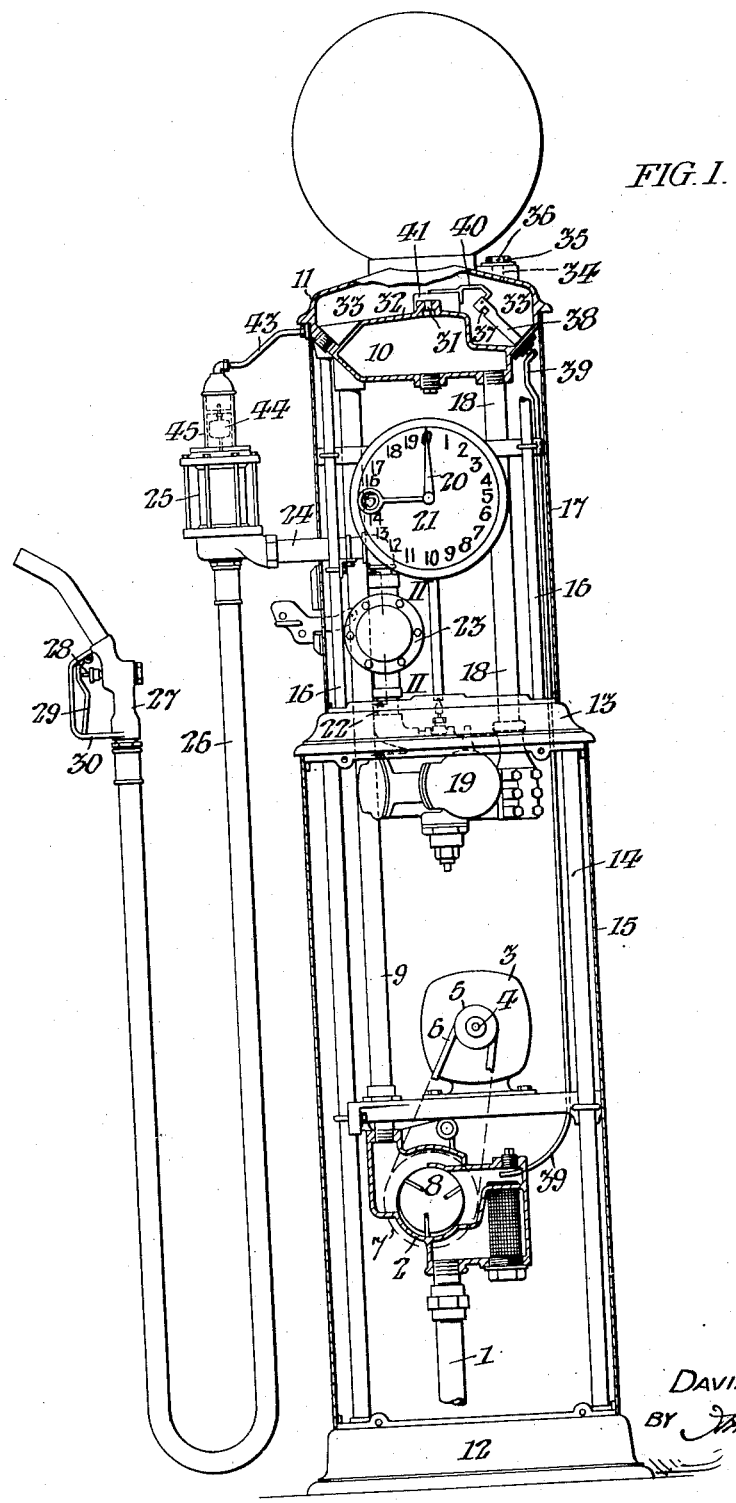

June 26, 1934.   D. S. WILLSON   1,964,616
PRESSURE CONTROL VALVE
Filed May 20, 1932   2 Sheets-Sheet 1

INVENTOR:
DAVID S. WILLSON,
BY

June 26, 1934.     D. S. WILLSON     1,964,616
PRESSURE CONTROL VALVE
Filed May 20, 1932     2 Sheets-Sheet 2
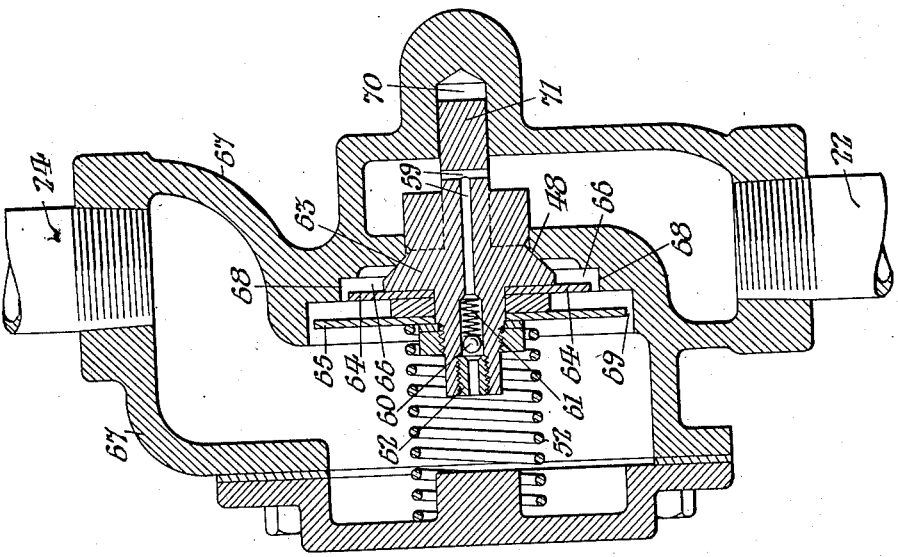
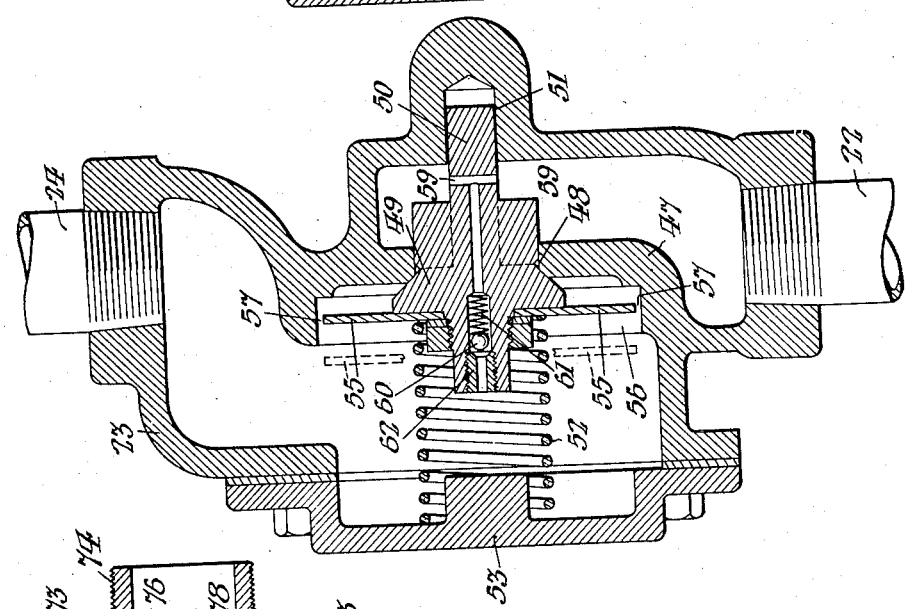
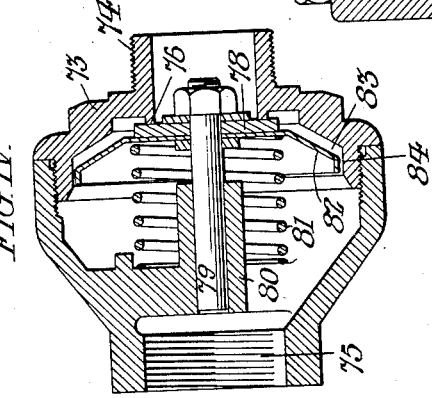
INVENTOR:
DAVID S. WILLSON,
BY Patented June 26, 1934

1,964,616

UNITED STATES PATENT OFFICE 1,964,616

PRESSURE CONTROL VALVE

David S. Willson, Conshohocken, Pa., assignor to Service Station Equipment Company, Conshohocken, Pa., a corporation of Delaware Application May 20, 1932, Serial No. 612,481

13 Claims. (Cl. 221—95)

My invention may be advantageously employed in apparatus for dispensing gasolene, from what is known as a curb stand, containing an electric motor controlled by a switch, at the stand, to operate a pump to suck the liquid from a subjacent tank and deliver it under pressure through a flow meter in the stand, and a dispensing hose which extends about ten feet from the stand, and has a manually operative nozle valve which is continually spring stressed toward its closed position. When the operator terminates a dispensing operation by releasing the nozle valve and permitting it to be closed by its spring; the electric motor and pump continue to operate until the operator returns to the stand and opens said switch. If there is a leak at the foot valve, or any where else in the suction line to the pump, the liquid in that line seeps back into said tank and is replaced by air, during the intervals between dispensing operations, when said pump is idle, and, upon resumption of its operation, air is drawn into the pump, and, under some circumstances, the liquid may be partly vaporized under suction of the pump. Of course, the passage of air or vapor through said meter, in lieu of liquid, cheats the customer. Therefore, I provide means to eliminate such occluded air or vapor through a vent to the atmosphere, and the principal function of my improved valve is to facilitate the elimination of such lighter fluids from the liquid without interference with the dispensation of the liquid. My improved control valve may be inserted in the dispensing conduit at any point between the pump and the extreme end of the nozle, that is, even beyond the nozle valve, and effect that purpose of controlling the pressure of dispensation of the liquid, with the effect of eliminating the lighter fluids from the liquid as aforesaid and with the further advantageous effect of materially decreasing the loss of pressure at said valve during each dispensing operation, in comparison with the ordinary poppet valves of the prior art. However, I prefer to install the control valve in the dispensing conduit within the curb-stand casing and between the pump and the hose. That form of control valve has the auxiliary function of harmlessly relieving any abnormal back pressure upon the dispensing conduit between the hose nozle and the pump when the control valve is closed, which may be occasioned by exposure of the hose to bright sunlight with consequent expansion of gasolene therein, and such relief is effected through an auxiliary valve, preferably mounted in the main control valve casing. In that form of my invention, the pressure control valve casing includes a main port and an auxiliary port, both of which are normally closed by spring pressure. However, the spring pressure to close the main port is in opposition to pressure from the pump and consequently in the direction of the pressure caused by the expansion of the liquid in the hose, and such pressure tends to maintain the main port closed, whereas, the spring pressure to close the auxiliary port is opposed by the pressure of the expansion of the liquid in the dispensing conduit, and, therefore, may be overbalanced to open said auxiliary port when the pressure of expansion exceeds a predetermined value, and, when said auxiliary port is thus opened, the back pressure from the dispensing conduit is relieved into the lighter fluid eliminator aforesaid, through the main valve casing.

My invention includes the various novel features of construction and arrangement herein set forth, not only including such a pressure control valve in liquid dispensing apparatus for the purpose above contemplated, but also including the specific construction and arrangement of said valve which is adapted for other uses.

In said drawings; Fig. I is a partly sectional elevation of a curb pump stand inclosing a control valve having both main and auxiliary ports aforesaid. Fig. II is a vertical sectional view of that valve, taken on the line II, II, in Fig. I, showing the main port closed and the auxiliary port opened by back pressure of the liquid from the hose. Fig. III is a vertical sectional view of a modified form of control valve including more than two differential pressure areas. Fig. IV is a sectional view of a modified form of control valve including only a main port.

Referring to Fig. I; the liquid to be dispensed is stored in an underground tank from which it is withdrawn through the conduit 1 by and to the pump 2 which is conveniently operated by the electric motor 3 having the armature shaft 4 provided with the pulley 5 connected by the belt 6 with the pulley 7 which is operatively connected with the rotor 8 of said pump 2. Said pump 2 discharges the liquid through the conduit 9 into the chamber 10 in the trap casing 11 which forms a substantially rectangular dome at the top of the curb stand. Said curb stand includes the substantially rectangular base 12 and center frame 13 connected by the vertical standards 14, surrounded by the removable sheet metal casing 15. Said center frame 13 is connected with said dome by the standards 16, surrounded by the removable sheet metal casing 17.

Said chamber 10 in the dome trap casing 11 is connected by the conduit 18 with the flow meter 19 which includes mechanism whereby the flowing liquid turns the indicator hand 20 with respect to graduations on the circular dial 21; to indicate the volume of fluid dispensed through said meter, from the conduit 18 to the conduit 22, and pressure control valve casing 23. The conduit 24 leads from said casing 23 into the sight gage including the transparent liquid container 25 in which the purchaser may observe whether liquid is being dispensed or not. When the apparatus is working properly, said sight gage 25 is continually filled with liquid which is, however, dispensable therefrom through the flexible hose 26 and nozle 27, under control of a valve 28 in said nozle which is spring pressed to close it but may be opened by the hand lever 29 within the handle guard 30 on said nozle.

The construction and arrangement above described are such that all of the fluid lifted by said pump 2; (which may include liquid, vapor therefrom, and air,) is compelled to pass through said trap chamber 10, and the liquid gravitates from the lighter fluids in said chamber. In order to eliminate the gaseous fluids from the top of said chamber 10, I provide the vent port 31 in the partition 32, through which such fluids may escape into the chamber 33 in the upper portion of said dome casing 11. The gaseous fluids separated from the liquid in said chamber 10 and passed through said port 31 into the chamber 33, escape from the latter through the vent port 34 in the top of said dome casing 11, which is provided with the removable screw plug 35 having vents 36 leading to the atmosphere.

Said port 31 also allows some liquid to pass from the chamber 10 in to the chamber 33 where it is trapped, by the valve 37, to be used to replace gaseous fluids eliminated from the sight gage 25. Said valve 37 is mounted to reciprocate in the valve casing 38, which is secured in the dome casing 11, and has the drain conduit 39 extending to the suction side of the pump 2. The lever 40, fulcrumed in the valve casing 38, connects said valve 37 with the float 41; so that whenever the trapped liquids accumulates above a predetermined level in said chamber 33, the valve 37 is automatically opened to return the surplus liquid to the pump 2.

Said transparent container 25 is connected with said chamber 33 by the conduit 43 which directs the gravitation of liquid from that chamber into said container to replace any lighter fluids which may escape from the container into said chamber and thence to the atmosphere through the vents 36. Preferably, the interchange of gaseous fluid and liquid between said container and said chamber 33 is controlled by the float valve 44 in the casing 45, which is lifted to closed position by the liquid, but subsides to open position, when lighter fluid accumulates beneath it.

The construction and arrangement above described are such that the operation of the pump 2 not only fills the container 25 but also normally fills the valve casing 45 with the liquid to be dispensed and, when the latter casing is substantially filled with liquid, it lifts said float valve 44 to shut off communication between the container 25 and said chamber 33. However, if and when any fluid lighter than the liquid rises into the top of said casing 45, the level of the liquid therein is thereby lowered and the valve 44 sinks and opens communication with the conduit 43 thus permitting the lighter fluid to escape through said conduit into the chamber 33 and thence to the atmosphere.

While said valve 44 is thus opened, the liquid trapped in said dome chamber 33 is free to gravitate into the top of the container 25 to replace the lighter fluids which have escaped and thus insure that the purchaser receives the full amount of liquid indicated by the meter at each dispensing operation.

As shown in Fig. II; said pressure control valve casing 23 includes the partition 47 having the port 48 for passage of liquid from the meter casing 19 to said transparent container 25. Said port 48 is controlled by the main valve 49 having the stem 50 mounted to reciprocate in the bearing 51 in said casing 23, with a dash pot effect, determined by the space between them. Said valve is maintained normally closed by the spring 52, the outer end of which abuts against the removable cover 53 of said casing 23.

Said valve 49 carries the annular flange 55 which, when the valve is shut as shown in Fig. II, extends in the circular recess 56 in said partition 47 but with its perimeter spaced from the circumference of said recess, as indicated at 57. The purpose and effect of said flange 55 is to present a greater area to the flow and pressure of liquid being pumped through said port 48 to, later, widely open the valve 49 to the position indicated by the dotted outline of said flange in Fig. II, against the pressure of said spring 52; if and when the valve 49 is subjected to a fluid flow which effects a greater total pressure on said valve than that by which it is displaced from its seat.

If that valve flange 55 were closely fitted like a piston in its recess aforesaid, the initial unseating of the valve 49 by pressure upon its minor area, exposed through said port 48 when the valve is shut, would be practically instantly followed by wide opening movement of said valve, permitting passage of not only all of the liquid pumped, but any lighter fluid mixed therewith. Provision for more or less leakage past that flange not only delays full opening movement of the valve until the lighter fluids are eliminated, but permits the operator to diminish and control the rate of flow at the dispensing nozle by manipulating the nozle valve 38, and without interruption of the dispensing flow, so that he can stop the dispensing operation when precisely the volume of liquid desired has been dispensed. However, when the nozle valve is closed at the end of a dispensing operation, and the back pressure between it and the control valve thereby increased, the control valve is closed by its spring, and during continued operation of the pump the liquid is by-passed from the pressure side of the pump to the suction side thereof.

The valve 49 is held in its wide open position only as long as full flow of liquid is being delivered through said port 48 by the pump. When the liquid flow and the pressure through said port 48 decreases, because of air or vapor entering the pump 2, said valve 49 is automatically throttled, by its spring 52, thereby causing the pressure to be increased, by the pump, and forcing all air and other lighter fluids out through the air eliminator in the dome 11 and allowing only liquid to enter the meter 19.

As said main valve 49 is closed by the spring 52 in the direction in which it tends to be closed by the back pressure of liquid from the sight gage 25; other means must be provided to relieve the pressure in said gage and the hose 26 due to expansion of the liquid. Therefore, although such means of relief may be formed in the partition 47, or any part of the casing 23 separating the inlet and outlet sides of the main valve 49, I prefer to form through said valve 49 the expansion vent passage 59 which is normally closed by the auxiliary valve 60 under pressure of the spring 61, opposed to the pressure of the liquid in the sight gage 25 and hose 26. Under normal conditions of pressure in the apparatus, i. e., unless and until an abnormal back pressure is created by expansion of the liquid in the hose 26 and its appurtenances; said passage 59 is closed by said valve 60. However, if and when the normal pressure is exceeded, said valve is opened as shown in Fig. II to relieve the excess pressure upon the left hand side of said valve 49 in Fig. II by permitting a portion of the liquid to escape through said passage 59 to the right in Fig. II and back through the meter 19 to the chamber 10 in the dome trap casing 11. As indicated in Fig. II, I prefer to form the seat for said valve 60 in the screw threaded bushing 62 which is removable.

Although in the form of my invention shown in Fig. II, I have shown a control valve provided with but two differential areas subjected to fluid stresses, it is to be understood that such valves may have three or more such areas. For instance, as shown in Fig. III, the valve 63, which is otherwise similar to the valve 49 above described, is provided with a flange 64 which presents a greater area than the port 48 to the flow and pressure of liquid through the latter but is of less area than the flange 65 on said valve 63 which is similar to the flange 55 on the valve 49. As shown in Fig. III, said valve flange 64 is mounted to reciprocate in the recess 66 in the valve casing 67, the cylindrical wall 68 of which is in such radially spaced relation with the flange 64 that displacement of said flange from the recess and consequent opening movement of the valve beyond its initial opening movement occasioned by the pressure upon the minor area of the valve presented through the port 48, is effected by a predetermined flow of liquid which builds up a pressure on said flange 64. Further, at a greater predetermined flow of liquid, a pressure is built up on flange 65, which further assists in opening the valve 63, until said flange 65 emerges from its recess 69. When the effective pressure is concentrated upon the flange 64, it is less per unit of area than that required to displace said valve 63 from its seat 48; similarly, when the effective pressure is concentrated upon the flange 65; it is less per unit of area than that which displaced said flange 64 from its recess 66. The effect of that arrangement is to cause the valve 63 to open with three steps, more or less distinct, as the three differential areas thereof presented to the pressure of the liquid become sufficiently effective to move the valve to permit respectively different predetermined volumes of liquid to pass through the port 48. In order to render the opening and closing movements of the control valve shown in Fig. III gradual, without hammer action, I prefer to form the dash pot 70 in the valve casing 67 for cooperation with the stem plunger 71 on the valve 63. Of course, the effect of such dash pot devices may be varied in accordance with the leakage afforded by the radially spaced relation of the valve stem plungers and their bearings.

The forms of my invention shown in Figs. I, II, and III are advantageous in the attainment of the several effects above contemplated; viz., first, the control valve functions to pass only liquid and force the lighter fluids out through the air eliminator with negligible opposition to the flow of liquid at the full capacity of the pump. For instance, assuming the pump to be displacing fifteen gallons per minute, five gallons of which is liquid and the other ten gallons vapor, the liquid pressure will be effective only against the minor area of the control valve, because the annular leakage space around the valve flange is sufficient to allow that amount of liquid to pass it without further axial movement of the valve. Consequently, the full effect of the valve closing spring is exerted against the liquid pressure upon the minor area of the valve only, equal to the valve port 48, and the ten gallons of vapor are forced out through the air eliminator because of the higher liquid resistance under those conditions. Second, rendering the pump operative at a lower operating load, when the control valve is opened, than is attainable in a dispensing apparatus equipped with an ordinary spring loaded check valve. Third, partially unloading the valve of the stress of the spring which tends to close it, as a consequence of the unseating of the valve by predetermined fluid pressure upon its minor area. Fourth, affording greater ease in the throttling effect upon the nozzle at the end of the flexible hose through which liquid is dispensed by the pump, under control of the operator. Fifth, regulation of the pressure at which the liquid is maintained in the hose and dispensed therefrom and in the meter or air eliminator to force the separation of the gaseous fluids from the liquid; said main valve operating as a check valve when the pump stops to retain the hose full of liquid at the pressure it was delivered into the hose, but said auxiliary valve operating to relieve any excess pressure which may be occasioned after the pump stops by expansion of the liquid in the hose and the conduit leading thereto from the control valve to the nozle valve, and, sixth, gradual opening and closure of the valve from minimum to maximum effective area without hammer action. Each of those effects may be varied over a wide range in accordance with the relative proportions of the elements of the structure which cooperate to produce them.

That is to say; first, the pump pressure may be varied in accordance with the height the liquid is to be lifted and the resistance to flow of the liquid in the conduit from the supply tank to the dispensing outlet. Second, with a given pump pressure and suction, the pressure at which the control valve is initially opened may be variably determined by varying either the area of the port in its casing, or the strength of the valve spring, or both. Third, the greater total pressure, or lesser pressure per unit of area, at which the control valve is widely opened may be variably determined by varying the area of the space around the annular flange of the valve which presents a greater area in opposition to the flow of liquid after the valve is unseated than is afforded when the valve is shut. Fourth, the latter variation may be effected by variation in the radius of that flange or of the recess in which it reciprocates, or both.

However, a control valve involving the essential features of my invention may be inserted in the liquid dispensing system at any point between the pump and the extreme end of the nozzle, with the attainment of some of the advantages above enumerated. For instance, in Fig. IV, I have shown a valve casing 73 with screw threaded connecting members 74 and 75 at axially opposite ends thereof adapted for inclusion anywhere in the dispensing system; for instance, between said hose 26 and nozle 27. The valve port 76 in said casing 73 is controlled by the valve 78 having the stem 79 mounted to reciprocate in the bearing 80. Said valve is continually stressed toward its closed position shown in Fig. IV by the spring 81, and has the annular flange 82 mounted to reciprocate in the recess 83 in any desired spaced relation with the cylindrical wall 84 of said recess in accordance with one or more of the effects above outlined, which may be desired.

Therefore, I do not desire to limit myself to the precise details of construction and arrangement herein set forth, as it is obvious that various modifications may be made therein without departing from the essential features of my invention, as defined in the appended claims.

I claim:

1. In liquid dispensing apparatus; the combination with a hose having a dispensing nozle provided with a valve spring pressed to close it; of a pump for supplying liquid to said hose; a pressure control valve casing interposed between said pump and said hose; a main valve port in said casing, for passage of liquid to be dispensed; a main valve, in said casing, for controlling said main port; a spring in said casing continually stressing said main valve to close it, in the direction opposite to the flow of liquid from said pump; whereby said main valve is normally closed, but adapted to be opened by a predetermined pressure of liquid from the pump before each dispensing operation, and the pressure loss at said main valve is materially reduced during each dispensing operation; an auxiliary pressure relief port in said casing; an auxiliary valve for controlling said auxiliary port; a spring continually stressing said auxiliary valve to close it in the direction of the flow of liquid from said pump; whereby said auxiliary valve is normally closed, but adapted to be opened by a predetermined back pressure of liquid between said main pressure control valve and said nozle valve; and means, including a conduit, for affording communication from said auxiliary port in said pressure control valve casing to the atmosphere; whereby back pressure of liquid between said nozle valve and main valve is automatically relieved through said auxiliary port when it reaches a predetermined value.

2. Apparatus as in claim 1; wherein the auxiliary relief port is in the main pressure control valve, and the auxiliary valve is carried by said main valve.

3. Apparatus as in claim 1; wherein the pressure control valve casing has a recess concentric with the main valve port opposite to the pump pressure side of the latter; and said main valve is provided with an annular flange fitted in said recess in slightly spaced relation therewith at its perimeter; whereby when said main valve is displaced from its seat by pressure of liquid from the pump; and when the liquid thus admitted through the main port is increased to a predetermined greater flow, it is effective upon said flange to widely open said main valve; and, when the normal pressure of liquid from the pump is diminished by inclusion of gaseous fluid in the liquid, said main valve is closed by its spring until normal pressure of the liquid from the pump is restored by elimination of the gaseous fluid back from said valve casing.

4. In liquid dispensing apparatus; the combination with a hose having a dispensing nozle provided with a valve spring pressed to close it; of a pump for supplying liquid to said hose; a pressure control valve casing interposed between said pump and said hose; a main valve port in said casing; a main valve, in said casing for controlling said main port; a spring in said casing continually stressing said main valve to close it in the direction opposite to the flow of liquid from said pump and adapted to be opened by pressure of liquid from the pump before each dispensing operation; and means, including a conduit for establishing communication from said valve casing to the atmosphere; whereby, until the liquid flow and pressure upon said valve by the pump reaches a predetermined value, said valve remains closed and the pump pressure is effective to eliminate from the liquid and discharge to the atmosphere gaseous fluids entrained in said liquid, between said pump and control valve, and the pressure loss at said main valve is materially reduced during each dispensing operation.

5. In liquid dispensing apparatus; the combination with a conduit including a hose having a dispensing nozle provided with a valve; of a pump for supplying liquid to said conduit; a pressure control valve casing in said conduit between said pump and said hose; a main valve, in said casing, for controlling said main port; a spring in said casing, continually stressing said main valve to close it in the direction opposite to the flow of liquid from said pump, but permitting said valve to be opened by a predetermined fluid pressure, and the pressure loss at said main valve is materially reduced during each dispensing operation; an auxiliary port in said casing; an auxiliary valve for controlling said auxiliary port; a spring continually stressing said auxiliary valve to close it in the direction of the flow of liquid from said pump; whereby said auxiliary valve is adapted to be closed by the pressure of liquid from the pump during each dispensing operation but adapted to be opened by back pressure of expansion of liquid; and fluid vent means leading from said auxiliary port; whereby back pressure of fluid in said hose is automatically relieved through said auxiliary port and vent means when it reaches a predetermined value.

6. In liquid dispensing apparatus; the combination with a pressure control valve casing having a main valve port; of a main valve, in said casing, for controlling said main port; a spring in said casing continually stressing said main valve to close it in the direction opposite to the flow of liquid but adapted to be opened by predetermined pressure of liquid, and the pressure loss at said main valve is materially reduced during each dispensing operation; an auxiliary port in said casing; an auxiliary valve for controlling said auxiliary port; a spring continually stressing said auxiliary valve to close it in the direction of the flow of liquid and adapted to be closed by the pressure of liquid during each dispensing operation but adapted to be opened by back pressure of liquid tending to close said main valve; and fluid vent means leading from said auxiliary port; whereby such back pressure of fluid in said casing is automatically relieved through said auxiliary port when it reaches a predetermined value.

7. In liquid dispensing apparatus; the combination with a pressure control valve casing having a main valve port; of a main valve, in said casing, for controlling said main port; a spring in said casing continually stressing said main valve to close it in the direction opposite to the flow of liquid but adapted to be opened by predetermined pressure of liquid and the pressure loss at said main valve is materially reduced during each dispensing operation; an auxiliary port in said main valve; an auxiliary valve, carried by said main valve, for controlling said auxiliary port; a spring, carried by said main valve, continually stressing said auxiliary valve to close it in the direction of the flow of liquid through said main port and adapted to be closed by the pressure of liquid during each dispensing operation but adapted to be opened by back pressure of fluid tending to close said main pressure control valve; and fluid vent means leading from said auxiliary port; whereby such back pressure of fluid in said casing is automatically relieved through said auxiliary port when it reaches a predetermined value, and materially reduce the pressure loss at said valve during each dispensing operation.

8. Apparatus as in claim 7; wherein the valve casing has a recess concentric with the main valve port upon the discharge side of said port; and said main valve has an annular flange fitted in said recess in spaced relation therewith at its perimeter; whereby, when said main valve is displaced from its seat by fluid pressure, and the flow of fluid through said port is increased to a degree predetermined by the spaced relation of said flange and recess, it is effective upon said flange to widely open said valve, and materially reduce the pressure loss at said valve during each dispensing operation.

9. In liquid dispensing apparatus; the combination with a dispensing conduit; of a valve for controlling dispensation of liquid through said conduit, at the will of the operator; a pump for supplying liquid to said conduit; a pressure control valve casing in said conduit, having a valve port, and a recess concentric with said port upon the discharge side of said port; a valve for controlling said port; a spring in said casing continually stressing said valve to close it in the direction opposite to the normal flow of liquid through said port but adapted to be opened by predetermined pressure of fluid; an annular flange carried by said valve, fitted in said recess in spaced relation therewith at its perimeter; whereby, when said valve is displaced from its seat by fluid pressure and said fluid is increased to a predetermined greater flow, it is effective upon said flange to widely open said valve, and materially reduce the pressure loss at said valve during each dispensing operation.

10. In liquid dispensing apparatus; the combination with a pressure control valve casing having a port through which the liquid is dispensed, and a recess concentric with said port upon the discharge side thereof; of a valve, in said casing, for controlling said port; a spring in said casing continually stressing said valve to close it in the direction opposite to the normal flow of liquid through said port but adapted to be overcome by predetermined pressure of fluid through said port; an annular flange on said valve, fitted in said recess, in spaced relation therewith at its perimeter; whereby when said valve is displaced from its seat by pressure of fluid, and when the flow of fluid through said port is increased to a predetermined degree, it is effective upon said flange to widely open said valve, and materially reduce the pressure loss at said valve during each dispensing operation.

11. In liquid dispensing apparatus; the combination with a pressure control valve casing having a port through which the liquid is dispensed, and means upon the discharge side of said port confining the flow of fluid through said port, relatively to said port; of a valve in said casing for controlling said port, having a plurality of differential areas for successive presentation to the flow of fluid through said port; a spring in said casing continually stressing said valve to close it in the direction opposite to the normal flow of fluid through said port; whereby, when said valve is closed by said spring, a minor area of the valve is exposed to the pressure of fluid at said port but said valve is adapted to be opened by predetermined pressure of fluid upon that minor area; and, after said valve is thus displaced from its seat and the flow of fluid through said port is increased to a degree predetermined by the relation of said fluid flow confining means, it is effective upon a greater area of said valve to overbalance said spring and open said valve to a greater extent, and less fluid pressure is required to open said valve to a given extent than if the fluid pressure were limited to the minor area of said valve; whereby the pressure loss at said control valve is materially reduced during each dispensing operation.

12. In liquid dispensing apparatus; the combination with a pressure control valve casing having a port through which the liquid is dispensed, and means upon the discharge side of said port confining the flow of fluid through said port, relatively to said port; of a valve in said casing for controlling said port, having a portion fitted to close said port; a spring in said casing continually stressing said valve to close it in the direction opposite to the normal flow of fluid through said port; and a circumferential flange on said valve, at the discharge side of said port, in cooperative radially spaced relation with the means for confining the flow of fluid through said port; whereby when said valve is closed by said spring a minor area of the valve is exposed to the pressure of the fluid at said port effective to open said valve, but, when said valve is displaced from its seat and the flow of fluid through said port is increased to a degree predetermined by the relation of said fluid flow confining means to said valve flange, it is effective upon a greater area of said valve, including said flange, to overbalance said spring and open said valve to a greater extent with less fluid pressure than if the fluid pressure were limited to said minor area of said valve, and the pressure loss at said valve is materially reduced during each dispensing operation.

13. In apparatus as in claim 12; a plurality of fluid confining means in the valve casing in respectively different relation to the axis of the valve; and a plurality of flanges on the valve respectively cooperatively related to said fluid confining means; whereby said valve may be opened by a succession of steps consequent upon exposure of increasing areas of said valve and flanges and to a greater extent, with less fluid pressure, than if the fluid pressure were limited to the area of said valve, which closes said port, and the pressure loss at said valve is materially reduced during each dispensing operation.

DAVID S. WILLSON.